United States Patent
Brandenburger et al.

(10) Patent No.: US 10,377,079 B2
(45) Date of Patent: Aug. 13, 2019

(54) METHOD FOR PRODUCING A LINER HOSE FOR LINING PIPES AND APPARATUS FOR CARRYING OUT THE METHOD

(71) Applicant: Brandenburger Patentverwertung GbR, Landau (DE)

(72) Inventors: Tim Brandenburger, Landau (DE); Peter Duttenhöfer, Ilbesheim (DE); Timo Singler, Ellerstadt (DE)

(73) Assignee: Brandenburger Patentverwertung Gbr, Landau (DE)

( * ) Notice: Subject to any disclaimer, the term of this patent is extended or adjusted under 35 U.S.C. 154(b) by 324 days.

(21) Appl. No.: 15/346,873

(22) Filed: Nov. 9, 2016

(65) Prior Publication Data

US 2017/0136684 A1 May 18, 2017

(30) Foreign Application Priority Data

Nov. 17, 2015 (DE) .......... 10 2015 014 730

(51) Int. Cl.
*B65D 90/04* (2006.01)
*B29C 63/48* (2006.01)
(Continued)

(52) U.S. Cl.
CPC ........ *B29C 63/481* (2013.01); *B29C 63/0004* (2013.01); *B29C 63/024* (2013.01);
(Continued)

(58) Field of Classification Search
CPC ..... B29C 63/065; B29C 66/80; B29C 66/532; B29C 63/481; B29C 63/105;
(Continued)

(56) References Cited

U.S. PATENT DOCUMENTS 3,570,749 A * 3/1971 Sato ............. B29C 53/50
383/112
3,760,738 A * 9/1973 Giraud ............. B61B 12/02
104/105
(Continued)

FOREIGN PATENT DOCUMENTS

DE 19823714 C2 7/2000
FR 2732925 A1 10/1996
(Continued)

OTHER PUBLICATIONS

Machine translation of FR 2732925, Publication date May 1997.*
(Continued)

*Primary Examiner* — Vishal I Patel
(74) *Attorney, Agent, or Firm* — Melgar IP Law pllc; Tod M. Melgar (57) ABSTRACT

A method for producing a liner hose (2) for lining pipelines, comprising the method steps of moving a circumferentially closed inner film hose (4) over a winding mandrel (6) of a winding apparatus (8) and wrapping the inner film hose (4), which is guided on the winding mandrel (6) by means of a guide mechanism (18), with a fibrous strip (12) which has been impregnated with curable reaction resin, is characterized in that the inner film hose (4) is guided via endless pulling means (14) that circulate without a drive, and in that the inner film hose (4) that has been wrapped with the fibrous strip (12) is moved off of the winding mandrel (6) solely by a pull-off mechanism (16) which acts from the outside on the fibrous strip (12). The invention further relates to a device for carrying out the method.

10 Claims, 5 Drawing Sheets

(51) Int. Cl.
  *B29C 63/06* (2006.01)
  *B29C 63/10* (2006.01)
  *B29C 65/00* (2006.01)
  *B29C 63/00* (2006.01)
  *B29C 63/02* (2006.01)
  *F16L 11/00* (2006.01)
  *B29K 105/08* (2006.01)
  *B29L 9/00* (2006.01)
  *B29L 23/00* (2006.01)
  *B29C 53/56* (2006.01)
  *B29C 53/60* (2006.01)
  *B29C 63/34* (2006.01)

(52) U.S. Cl.
  CPC .......... *B29C 63/065* (2013.01); *B29C 63/105* (2013.01); *B29C 66/532* (2013.01); *B29C 66/80* (2013.01); *F16L 11/00* (2013.01); *B29C 53/566* (2013.01); *B29C 53/60* (2013.01); *B29C 63/34* (2013.01); *B29K 2105/0872* (2013.01); *B29L 2009/00* (2013.01); *B29L 2023/005* (2013.01)

(58) Field of Classification Search
  CPC ... B29C 53/566; B29C 53/60; B29C 63/0004; B29C 63/024; B29C 63/34; B29L 2009/00; B29L 2023/005; B29K 2105/0872; F16L 11/00
  See application file for complete search history.

(56) References Cited

U.S. PATENT DOCUMENTS 4,120,324 A    10/1978  Pahl
6,189,884 B1 *  2/2001  Jeske ..................... B65H 29/66
                                                    271/182

FOREIGN PATENT DOCUMENTS

FR    2732925 B1 *  5/1997  .......... B29C 53/607
JP    S6179634 A    4/1986

OTHER PUBLICATIONS

Machine translation of DE 19823714; Publicaiton Jul. 6, 2000.*
DE19823714 (Machine translation).
EPO Search Report dated Jul. 4, 2017).

* cited by examiner

METHOD FOR PRODUCING A LINER HOSE FOR LINING PIPES AND APPARATUS FOR CARRYING OUT THE METHOD

This application is based on and claims priority to German Patent Application No. DE 10 2015 014 730.7 filed on Nov. 17, 2015, the entire contents of which are incorporated herein by reference.

The invention relates to a method for producing a liner hose for lining pipes and an apparatus for carrying out the method, according to the preamble of claims 1 and 4.

For the trenchless renewal of damaged sewer pipes, liner hoses referred to as "inliners" are increasingly being used, which are made of a fibrous material, particularly fiberglass cloth impregnated with a liquid reaction resin; the liner hose is pulled into the pipe and then expanded using compressed air, after which the resin is cured using light from a radiation source.

A liner hose of this type along with a method and a device for producing such a hose are known, for example, from DE 198 23 714 C2.

The liner hose is produced by winding the resin-impregnated fibrous strips, overlapping one another, in a winding apparatus, onto an inner film hose which is permeable to UV light, and which has been pulled, for example, onto a cantilevered support tube, at the end of which a winding mandrel is located, over which the inner film hose is drawn during the winding process. For this purpose, the winding mandrel has a guide mechanism with electrically powered circulating belts which contact the inside of the inner film hose during production and advance said hose over the winding mandrel, and also has an assigned pull-off mechanism having two rotating pull-off rollers, which contact the outside of the wrapped liner hose and pull it off of the winding mandrel.

It is a problem with the above-described winding apparatus that the electrically powered guide mechanism must be supplied with power, and the supply and control lines required for this must be fed through the entire circumferentially closed inner film hose before and during the production of a liner hose. This essentially rules out the production of liner hoses of any possible length on the above-described winding mandrels.

A further problem associated with the above winding apparatus results from the mandatory synchronization of the electrically powered guide mechanism on the inside of the liner hose with the likewise electrically powered pull-off mechanism on the outside of the hose. If voltage fluctuations occur in the longitudinal direction of the inner film hose or liner hose during production, this will result in asynchronous operation of the pull-off mechanism and the guide mechanism, causing the inner film hose to become locally either compressed or stretched. Both can lead to shifts and dislocations between the inner film hose and the wrapped layer of fibrous strips arranged thereon, which may lead to a wrinkling of the film of the inner film hose, substantially impairing the quality of the liner hose once it is cured.

In the worst case, such wrinkling may result in leaks in the liner hose, which—if the damage is initially undetected—may result in air escaping during the subsequent opening up of the liner hose once the liner hose has been pulled into a pipeline to be renewed, and in a collapse of the liner during curing.

It is therefore an object of the present invention to devise a method for producing a wrapped liner hose for lining pipes, by which said hoses can be manufactured with high quality at a reduced apparatus cost.

This object is achieved according to the invention by a method having the features of claim 1.

It is a further object of the present invention to provide an apparatus for carrying out the method, with which a liner hose composed of wrapped, resin-impregnated fibrous strips can be manufactured at reduced apparatus cost.

This object is achieved according to the invention by a device having the features of claim 7.

Additional features of the invention are described in the dependent claims.

According to the invention, in a method for producing a liner hose for lining pipelines or ducts, a circumferentially closed inner film hose is moved over a winding mandrel of a winding apparatus. In this method, the inner film hose, which is guided on the winding mandrel by means of a guide mechanism, is wrapped with a fibrous strip which is impregnated with a liquid reaction resin, which can be cured in particular using UV light. The inner film hose is guided according to the invention over at least two endless pulling means, in particular belts, which are held on the winding mandrel and circulate without a drive, and which preferably run on ball bearings to reduce friction. The inner film hose which is wrapped with the fibrous strip is advanced over the winding mandrel during winding with the fibrous strip solely by a pull-off mechanism which act from the outside on the wrapped fibrous strip.

The driveless configuration of the endlessly circulating pulling means, which may also be embodied as chains with corresponding contact surfaces against which the inner film hose rests, has the advantage that the sensitive inner film hose can be any length in design, and that a substantial time savings in the production of the liner hoses is achieved, since the placement of power lines through the inner film hose is unnecessary. In addition, since the electric drives and mechanical gearing mechanisms that were previously required to drive the circulating belts have been eliminated, the weight of the winding mandrel can be advantageously decreased, thereby substantially simplifying the overall design of the components for holding the support tube on which the winding mandrel is cantilevered.

According to a further concept underlying the invention, the guide mechanism can be acted on by an additional counter force directed counter to the pull-off force exerted by the pull-off mechanism on the liner hose.

This results in the advantage that the inner film hose can be acted on by a certain pre-tension, with which an optimal positioning of the inner film hose on the wrapped fibrous strip is obtained, thereby preventing any compression of the liner hose.

In the above-described embodiment of the method according to the invention, the counter force is preferably variable, making it possible to select the tensile force that is exerted on the inner film hose in the longitudinal direction based on the diameter of the liner hose, and also based on the material properties of the inner film hose or of the wrapped fibrous material, so as to improve the production process.

Another advantage that is associated with a variable counter force is that it allows fluctuations in tension occurring in the longitudinal direction of the inner film hose can be compensated for if desired by controlling the counter force so as to generate a substantially constant counter force, thereby causing the inner film hose to be acted on by a nearly constant tensile force throughout the entire production process. Local stretching or compression of the sensitive inner film hose and a consequent weakening or wrinkling of the film material is thereby prevented, and production quality is increased accordingly.

According to further concept of the invention, an apparatus according to the invention for carrying out the above-described method comprises a winding mandrel on which a guide mechanism having at least one circulating pulling means is arranged. The inner film hose is pulled by a pull-off mechanism over the guide mechanism, which preferably comprises two pull-off rollers that contact the exterior of the liner hose, but may alternatively also comprise two or more circulating driven belts. The apparatus according to the invention is characterized in that the guide mechanism comprises a continuously circulating pulling means, which is movable parallel to the surface of the winding mandrel, and which is moved via at least two free-running guide rollers held on the winding mandrel, i.e. via guide rollers which are not coupled to a drive that drives them in the direction of advance of the liner hose.

This driveless configuration of the guide mechanism or guide mechanisms of the winding mandrel makes it possible for the circumferentially closed inner film hose to be fed to the winding mandrel, for example, from a roll, in any possible length, without having to be unwound in advance and control and power supply lines inserted.

The invention results in the further advantage that no additional electric power is required for operating the mandrel, since the circulating pulling means which guide the inner film hose during the winding process and tauten it in the circumferential direction, and at least two of which are arranged on opposite sides of the winding mandrel, are driven solely by the pulling force exerted by the pull-off mechanism.

In the preferred embodiment of the invention, the circulating pulling means is preferably an endless belt which is guided on ball bearings along its entire length and has a mushroom cap-shaped cross-section. This results in the advantage that the inner film hose, which is sensitive to mechanical strains, rests uniformly over nearly the entire outer surface of the belt.

In the above-described embodiment of the invention, the endless belt is preferably equipped on its underside with chain link-type reinforcing elements. These are preferably made of a harder material than the rubber-like material applied to the upper side. For instance, the reinforcing elements may be made of construction plastics, while the upper side of the belt is made, for example, of an elastomeric material, in particular flexible rubber.

This has the advantage that the rolling resistance of the belt is further reduced as compared with a belt made exclusively or nearly exclusively of an elastomeric material.

According to a further concept underlying the invention, the endless belt has on its underside a central fixed member, and is mounted on both sides of the central fixed member on ball bearings, which are mounted, for example, on a common support body of the guide mechanism. The lateral contact surfaces of the belt preferably extend like wings beyond the ball bearings at their ends, so that the ball bearings are completely covered by the belt, and the film material of the inner film hose cannot reach the rotating parts of the ball bearings. An inverted embodiment is likewise conceivable, in which the ball bearings are mounted at the center of the belt in a longitudinal groove and are delimited on each side thereof by fixed members.

This results in the advantage that the belt is guided, and the rolling resistance is further reduced.

In the preferred embodiment of the invention, a braking element, for example an electric or magnetic eddy current brake, is assigned to at least one guide roller.

The use of an electric or magnetic eddy current brake has the advantage that the force acting on the inner film hose counter to the pull-off direction can be selectively varied if desired, without any emergent brake dust, such as occurs, for example, with a mechanical friction brake, contaminating the inside of the liner hose.

According to a further embodiment of the invention an adjustment device for adjusting the diameter of the winding mandrel is assigned to the guide mechanism. The adjustment device may comprise, for example, a central shaft which extends longitudinally along the winding mandrel, the rotational movement of said shaft being transmitted at multiple points via gears to spindle drives or gear racks, which act on the guide mechanisms movably held on the winding mandrel.

The above-described embodiment of the invention has the advantage that all the guide mechanisms can be moved simultaneously in the radial direction by rotating the central shaft. This enables the diameter of the winding mandrel to be increased or decreased substantially uniformly in the radial direction.

According to a further concept underlying the invention, at least one of the guide mechanisms is held movably on the winding mandrel in a plane that extends perpendicular to the pull-off direction of the liner hose, and is acted on by resiliently elastic means, which are supported at least indirectly on a stationary part of the winding mandrel, with a substantially constant resiliently elastic force applied in the radial direction.

This has the advantage that production-related variations in the diameter of the inner film hose are automatically compensated for, and the risk of wrinkle formation as a result of circumferential variations in tension in the film material is further reduced.

The resiliently elastic means may comprise, for example, a pneumatic spring element, in particular a bellows cylinder or a pneumatic cylinder, which is acted upon by compressed air from a compressed air source, and which has a significantly larger volume, for example 10 to 100 times as large a volume as the volume of the working chamber of the pneumatic spring element.

This makes it possible to adjust the force acting on the inner film hose in the radial direction, for example by increasing or decreasing the air pressure in the compressed air source, and thereby acting on the inner film hose with different levels of pre-tension.

In the following, the invention will be described in the context of a preferred embodiment, with reference to the drawings.

Figure 1:
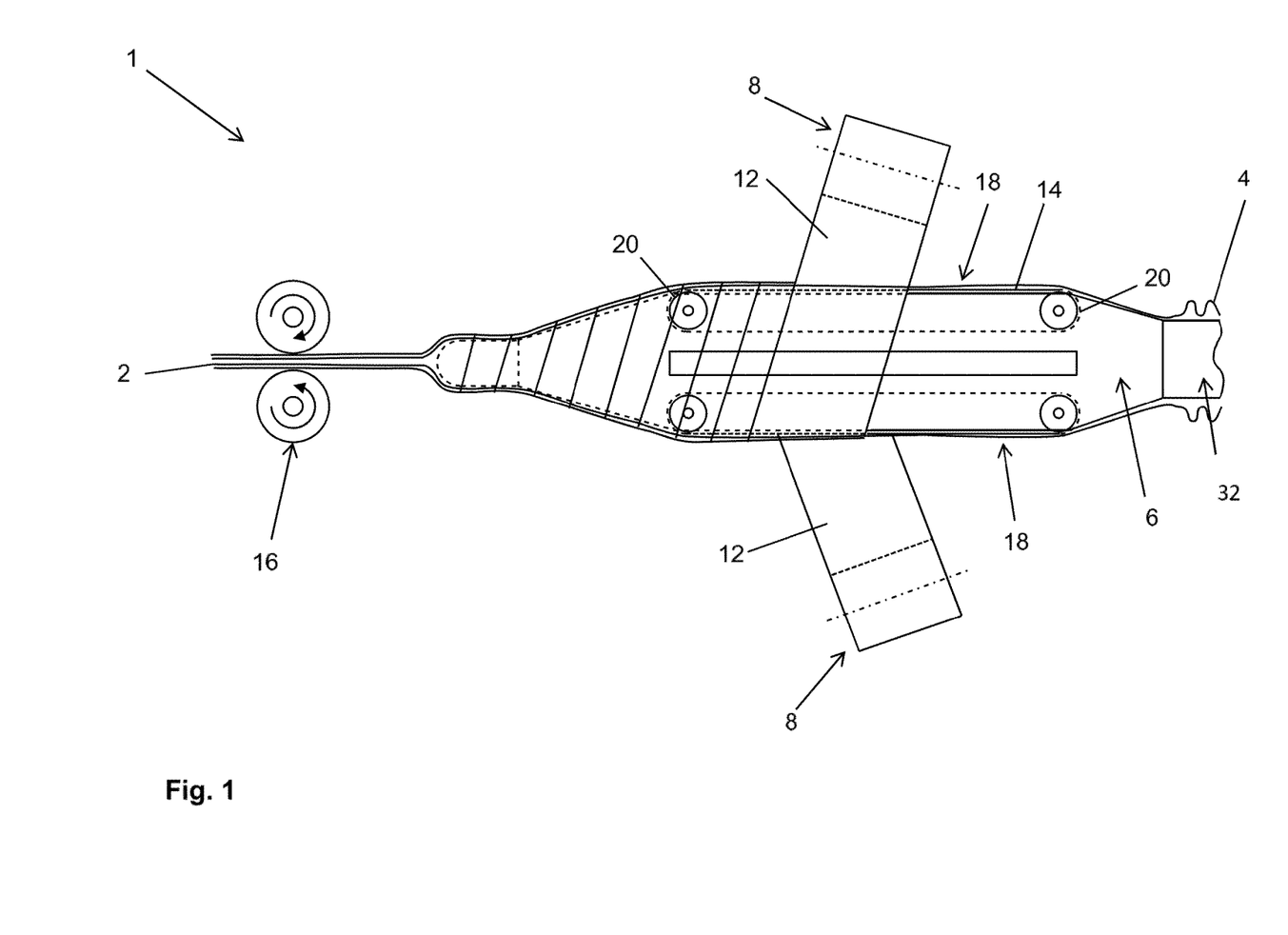
FIG. 1 shows a schematic side view of a device according to the invention with an indicated winding apparatus, during production of a liner hose.

As is shown in the diagram of FIG. 1, an apparatus 1 for producing a liner hose 2 according to the invention for lining pipes comprises a winding mandrel 6, on which at least one, but preferably two or more guide mechanisms 18 are arranged. Liner hose 2 consists of a circumferentially closed inner film hose 4 and at least one fibrous strip 12 wound in an overlapping manner onto inner film hose 4 by a schematically indicated winding apparatus 8, which fibrous strip is impregnated with a reaction resin that can particularly be cured using UV light. As is clear from the diagram of FIG. 1, winding mandrel 6 is attached to a cantilevered support tube 32, onto which a section of inner film hose 4 to be processed is pulled and is stored in the collapsed state.

Guide mechanism 18 has an endlessly circulating pulling means which is movable substantially parallel to the surface of winding mandrel 6, and which is preferably embodied as a circulating belt 14, over which inner film hose 4 is pulled by a pull-off mechanism 16 containing two pulling rollers. Although the endlessly circulating pulling means may also be embodied as a chain with separate chain links, on each of which a contact surface, e.g. provided with a rubber-like coating, is formed, in the interest of clarity the invention will be described below in the context of the example of a circulating belt 14.

Figure 2:
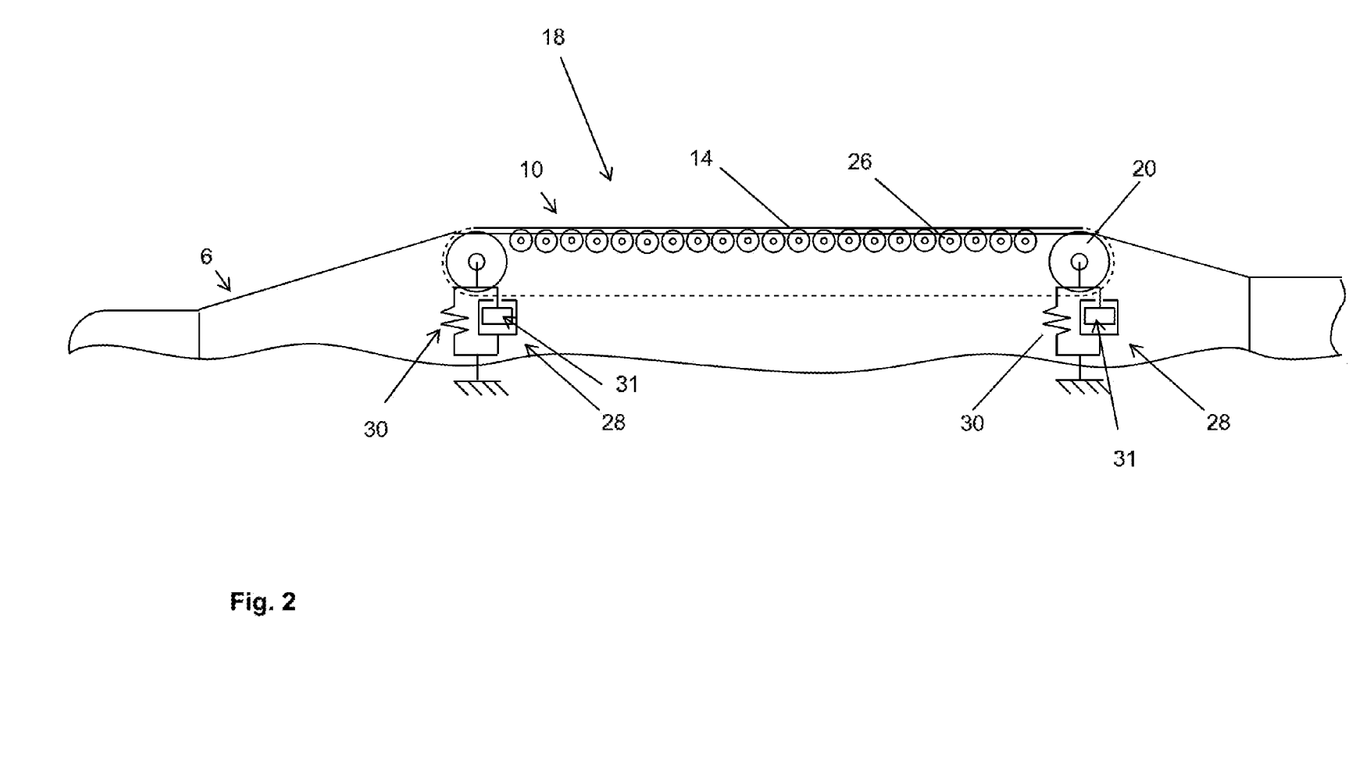
FIG. 2 shows a schematic side view of a guide mechanism according to the invention.

As is further clear from the diagram of FIGS. 1 and 2, endlessly circulating belt 14 travels over at least two free-running guide rollers 20, rotatably mounted on winding mandrel 6, which are not driven and which form the turning points at which the belt 14, or generally speaking the endless pulling means, is reversed.

In the following, the method for producing a liner hose 2 for lining pipes will be described with reference to FIG. 1. In this method, the circumferentially closed inner film hose 4, which has been pushed by hand onto support tube 32 prior to the start of the method, is pulled by the two pulling rollers of pull-off mechanism 16 over winding mandrel 6 of winding apparatus 8. As inner film hose 4, which is guided on winding mandrel 6 by means of guide mechanisms 18, advances, it is wrapped by the rotation of winding apparatus 8 with at least one fibrous strip 12, which is impregnated with a liquid reaction resin that can be cured by electromagnetic radiation, in particular by UV light, or also by heat.

Pull-off mechanism 16 thus moves inner film hose 4, which enters pull-off mechanism 16 in the form of liner hose 2 wrapped with fibrous strip 12 following several revolutions of winding apparatus 8, beyond winding mandrel 6 at a speed which is synchronized with the rotational movement of winding apparatus 8. Inner film hose 4 is guided in a manner according to the invention solely via the drivelessly circulating endless belt 14 of the respective guide mechanisms 18, of which with small diameters at least 2, and with large diameters four, six or even up to eight guide mechanisms may be provided on winding mandrel 6. During production according to the invention, inner film hose 4 wrapped with fibrous strip 12 is advanced over winding mandrel 6 solely by pull-off mechanism 16 acting on the exterior of fibrous strip 12.

According to an alternative embodiment of apparatus 1 according to the invention that is not illustrated in the drawings, pull-off mechanism 16 may also comprise, in addition or alternatively to the two pull-off rollers 16 shown in FIG. 1, one or more driven rollers or driven circulating belts, which circulate outside of the circulating area of winding apparatus 8, e.g. below or to the side of winding mandrel 6, along a non-driven pulling means/belt 14, and can be engaged against the surface of liner hose 2 in this area. For this purpose, the circulating pulling means/belts 14 are positioned on winding mandrel 6 in such a way, and have such a length, that they circulate at least partially in the area of winding apparatus 8, i.e. in the area where fibrous strip 12 is being moved around inner film hose 4, and partly in the area outside of said area. The additional pull-off rollers or circulating belts, which can be engaged externally on guide mechanisms 18, are preferably driven by means of electric motors.

FIG. 2 further shows a schematic side view of a guide mechanism 18 according to the invention, in which endless belt 14 is guided over two turning rollers 20 disposed at the ends, between which a plurality of ball bearings 26 are arranged in a row, on which the endlessly circulating belt 14 is supported when the outer side of said belt is in contact with the inner surface of inner film hose 4. At least one guide mechanism 18 can be supported on winding mandrel 6 via resiliently elastic means 28, which are designed, for example, as a spring-damper combination having a spring element 30 and a damping element 31, and which support the respective guide mechanism.

Guide mechanisms 18 can further be movably held via guides (not shown), for example linear guides having an end stop, on winding mandrel 6, the position of a guide mechanism 18 which is held resiliently on the winding mandrel preferably being adjusted such that during the production process, the guide mechanism is preferably deflected only up to one-half of the maximum movement path.

Figure 3:
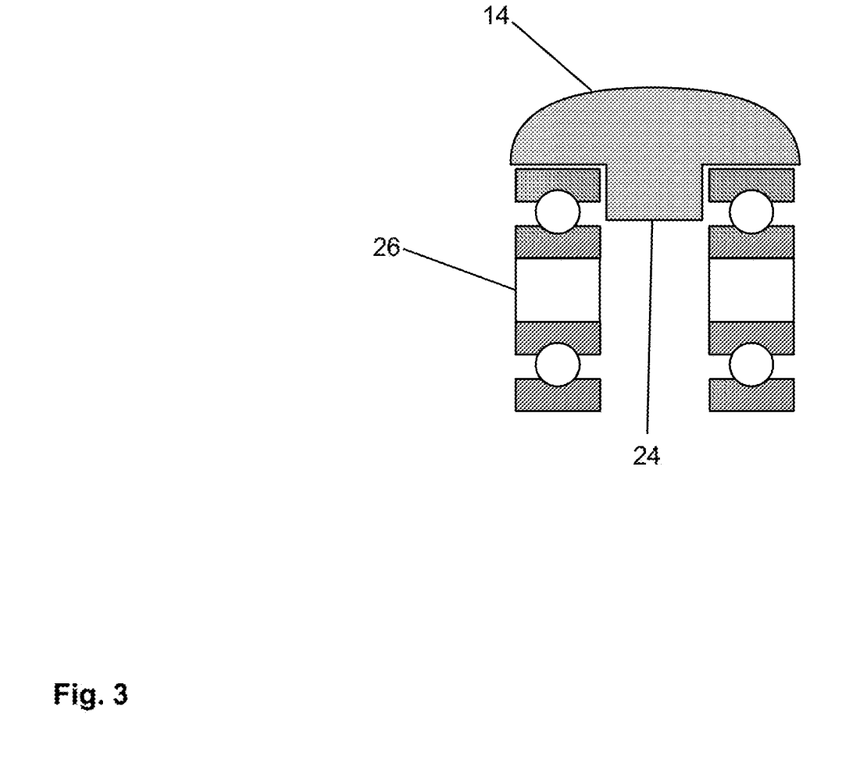
FIG. 3 shows a schematic cross-sectional diagram of a belt with a central fixed member, mounted on ball bearings, according to the invention.

FIG. 3 shows a schematic cross-sectional diagram of a preferred embodiment of the ball bearing-mounted belt 14 according to the invention, which has a central fixed member 24. On each side of central fixed member 24, a ball bearing 26 is arranged, on which belt 14 is mounted in the longitudinal direction. Ball bearings 26 are preferably held on a common shaft (not shown), as is indicated, for example, in FIG. 5 by pins 34.

Figure 4:
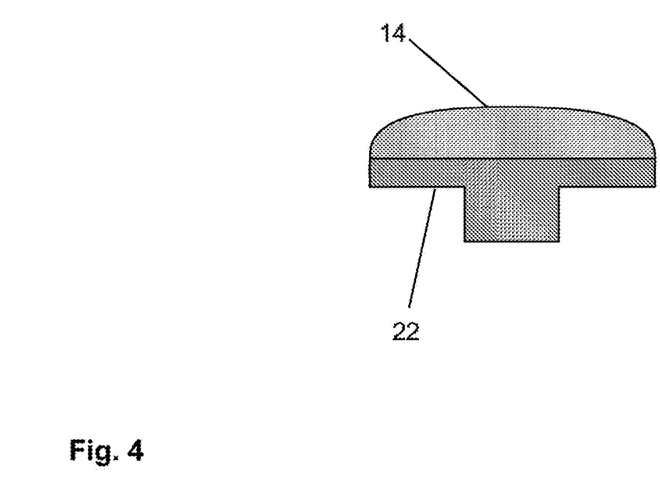
FIG. 4 shows a schematic cross-sectional diagram of belt with reinforcing elements, according to the invention.

FIG. 4 further shows a schematic cross-sectional diagram of a belt 14 according to the invention, which is equipped on its underside with reinforcing elements 22. The upper side of belt 14 in this embodiment is made of an elastic, preferably rubber-like material, while on the underside of belt 14, chain link-like reinforcing elements 22 are arranged, which are made, for example, of a hard plastic material such as polyamide or polycarbonate, or also of metal. The reinforcing elements 22 serve to further reduce the rolling resistance of belt 14.

Figure 5:
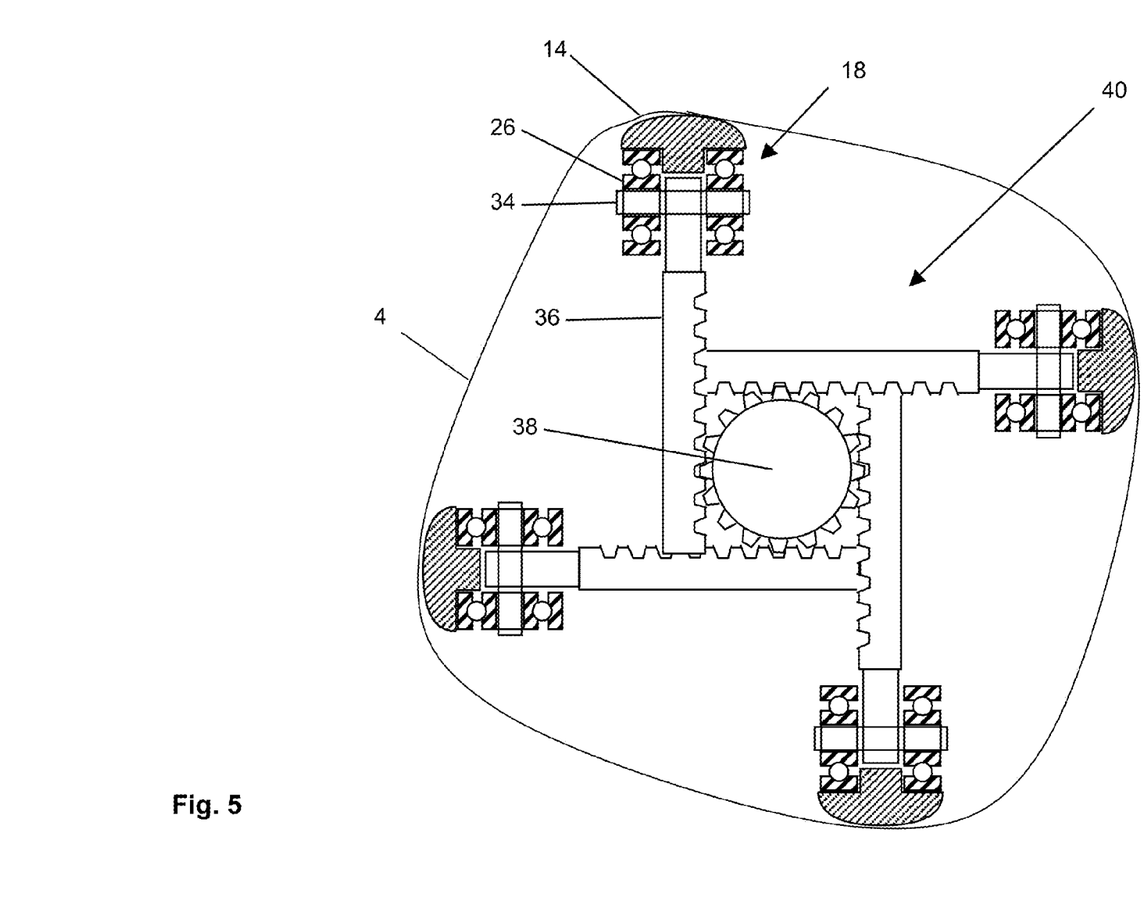
FIG. 5 shows a schematic diagram of an adjustment device according to the invention.

Finally, FIG. 5 shows a not-to-scale schematic diagram of an adjustment device 40 according to the invention. Adjustment device 40 has four guide mechanisms 18, each of which is mounted on a gear rack 36 and is guided via linear bearings (not shown in detail) such that the guide mechanisms can be moved radially by rotating a central shaft 38. By rotating central shaft 38, the diameter, defined by the four outer sides of belt 14, of the inner film hose 4 being guided over the belt is changed.

LIST OF REFERENCE SIGNS

1 apparatus according to the invention
2 liner hose
4 inner film hose
6 winding mandrel
8 winding apparatus
12 fibrous strip
14 circulating pulling means/belt
16 pull-off mechanism
18 guide mechanism
20 guide roller
22 chain link-like reinforcing elements
24 central fixed member
26 ball bearing 28 resiliently elastic means
30 spring element
31 damping element
32 support tube
34 pin
36 round gear rack
38 central shaft
40 adjustment device

The invention claimed is:

1. An apparatus for producing a liner hose for lining pipelines, which comprises a circumferentially closed inner film hose and at least one fibrous strip which is wound onto the inner film hose and is impregnated with a curable reaction resin, said apparatus comprising: a winding mandrel on which a guide mechanism is arranged, over which the inner film hose is moved by a pull-off mechanism, wherein the guide mechanism comprises a non-driven endlessly circulating pulling means which is movable substantially parallel to the surface of the winding mandrel, and which is moved over a plurality of free-running, non-driven guide rollers held on the winding mandrel, and wherein the plurality of guide rollers include a proximal and distal free-running, non-driven guide rollers disposed at a proximal and distal turning points of the endlessly circulating pulling means.

2. The apparatus according to claim 1, wherein the pulling means is a chain or a belt having a mushroom cap-like cross-section.

3. The apparatus according to claim 2, wherein the belt has a chain link-like reinforcing elements on an underside of the belt.

4. The apparatus according to claim 2, wherein an underside of the belt has a central fixed member, and the belt is mounted on ball bearings on both sides of the central fixed member.

5. The apparatus according to claim 1, wherein a braking element is assigned to at least one guide roller.

6. The apparatus according to claim 1, wherein the mandrel further includes an adjustment device configured to adjust at least one of a cross-sectional area or a diameter of the winding mandrel.

7. The apparatus according to claim 1, wherein the pull-off mechanism comprises at least one driven roller or at least one driven circulating belt, which circulates outside of the circulating area of the winding apparatus, in the area of the endlessly circulating pulling means, and can be placed against an exterior of the liner hose.

8. The apparatus according to claim 1, wherein the guide mechanism is held on the winding mandrel such that it is movable in a radial direction, and is acted on by resiliently elastic means with a substantially constant resiliently elastic force in the radial direction.

9. The apparatus according to claim 8, wherein the resiliently elastic means comprise a pneumatic spring element that can be connected to a compressed air source.

10. An apparatus for producing a liner hose comprising:
a winding mandrel extending longitudinally from a proximal end to a distal end, the winding mandrel having a guide mechanism extending longitudinally along the winding mandrel and substantially parallel with a surface of the winding mandrel, the guide mechanism being adapted to receive and engage an inner surface of an inner film hose, wherein the guide mechanism comprises an endlessly circulating, free-running, non-driven belt extending longitudinally and substantially parallel to the surface of the winding mandrel, and wherein the belt is supported by a plurality of guide rollers wherein all of the guide rollers are free-running, non-driven guide rollers;
a winding apparatus radially spaced from the winding mandrel and adapted to rotate about the winding mandrel and wind at least one fibrous strip impregnated with a curable reaction resin onto the inner film hose to form a liner hose; and
a pull-off mechanism longitudinally spaced from the distal end of the guide mechanism, the pull-off mechanism having at least one driven roller or belt adapted to engage an exterior surface of the liner hose, and wherein the driven roller or belt rotates in a direction to pull the liner hose over the winding mandrel and guide mechanism.

* * * * *